United States Patent [19]

McClenahan

[11] 3,821,546

[45] June 28, 1974

[54] PHOTOMULTIPLIER CIRCUIT INCLUDING MEANS FOR RAPIDLY REDUCING THE SENSITIVITY THEREOF

[75] Inventor: James O. McClenahan, San Jose, Calif.

[73] Assignee: The United States of America as represented by the Administrator of the National Aeronautics and Space Administration, Washington, D.C.

[22] Filed: Nov. 28, 1972

[21] Appl. No.: 310,193

[52] U.S. Cl. .......... 250/207, 307/252 L, 307/252 Q

[51] Int. Cl. .......... H01j 39/12

[58] Field of Search ...... 250/207; 307/252 L, 252 Q

[56] References Cited

UNITED STATES PATENTS

| | | | |
|---|---|---|---|
| 2,647,436 | 8/1953 | Shapiro | 250/207 |
| 2,815,453 | 12/1957 | Colson | 250/207 |
| 2,840,720 | 6/1958 | Van Rennes | 250/207 |
| 2,846,591 | 8/1958 | Valeton | 250/207 |
| 3,543,095 | 11/1971 | Ensminger | 250/207 |
| 3,614,646 | 10/1971 | Hansen | 250/207 |

*Primary Examiner*—James W. Lawrence
*Assistant Examiner*—Harold A. Dixon
*Attorney, Agent, or Firm*—Darrell G. Brekke; Armand G. Morin, Sr.; John R. Manning

[57] ABSTRACT

A photomultiplier tube comprising a plurality of electrodes including a light sensitive cathode, an anode, and a plurality of dynodes positioned in space-apart manner along the electron beam path between the cathode and anode and having a power supply and a voltage divider for supplying bias voltages across each successive pair of electrodes along the beam path, at least one switching device being provided across a pair of said electrodes, preferably across the cathode and first dynode or across the first and second dynodes, which, when activated, will rapidly reduce the bias voltage across the associated pair of electrodes to near zero, thereby substantially reducing the sensitivity of the multiplier to protect it from the effects of excessive light intensity input. In a preferred embodiment of the invention, an SCR is coupled across the cathode and first dynode and is operated by a blanking or trigger pulse applied to its control gate to rapidly reduce the bias voltage across this first stage. Additional switching rectifiers may be employed across other stages of the multiplier to insure the desired reduction in sensitivity.

1 Claim, 3 Drawing Figures

PATENTED JUN 28 1974 3,821,546

PHOTOMULTIPLIER CIRCUIT INCLUDING MEANS FOR RAPIDLY REDUCING THE SENSITIVITY THEREOF

The invention described herein was made by an employee of the United States Government and may be manufactured and used by or for the Government for governmental purposes without the payment of any royalties thereon or therefor.

BACKGROUND OF THE INVENTION

In many instances of radiation measurements whit photomultiplier detectors, it is necessary to isolate or otherwise shield the photomultiplier device from the radiation source to protect the photomultiplier from damage. For example, during operation of the detector, short bursts of very high intensity radiation may impinge on the detector and seriously overload the device. In shock tube measurements, the light levels are very minute during the precursor region and the measurement requires a detector with very high sensitivity or gain. However, when the incident shock wave arrives at the detector, the radiative intensity is suddenly many decades higher than before and it is necessary that the detector be able to withstand this sudden surge or that the detector by protected from this high intensity pulse.

In the past, photomultipliers have been protected in the above type of operation either by means of shuttering mechanically the light beam impinging on the detector or by short circuiting the high voltage at the input terminals of the photomultiplier by a crow bar circuit. The mechanical shutter technique is satisfactory so long as very fast shuttering times (e.g., less than 1 millisecond) are not needed; the shuttering mechanism becomes relatively complicated at such speeds. In the case of shock tube measurements, shuttering times of 10 microseconds or less are required and mechanical shuttering of the light beam requires the use of very sophisticated means such as powder charges or high current pulses moving a shutter into the field of view of the detector.

The technique of short circuiting the high voltage input to the detector requires moderately high voltage devices such as a 3000 V ignitron which will rapidly short circuit the power supply output terminals. Special circuitry is required to trigger the ignitron and the power supply must be designed for or protected from the effects of the short circuit at its output terminals. As with the mechanical shuttering approach, this latter technique requires complex and costly components.

BRIEF SUMMARY OF THE PRESENT INVENTION

The present invention provides a simple, reliable and inexpensive control circuit for rapidly reducing the bias voltage across one or more of the dynode stages of a photomultiplier, to thereby substantially decrease its sensitivity to incoming light at those times where excess light intensity might damage the tube. The control circuit comprises a switching device, such as a silicon controlled rectifier (SCR), coupled between a pair of the electrodes in the tube, preferably the cathode and first dynode, or the first and second dynodes, the switching device operating in response to a trigger pulse applied to its gate to short circuit the two electrodes. To insure the desired reduction in sensitivity, two switching devices may be employed between two of the electrode stages, the devices being operated simultaneously to short circuit both stages.

DESCRIPTION OF THE PREFERRED EMBODIMENTS

Figure 1:
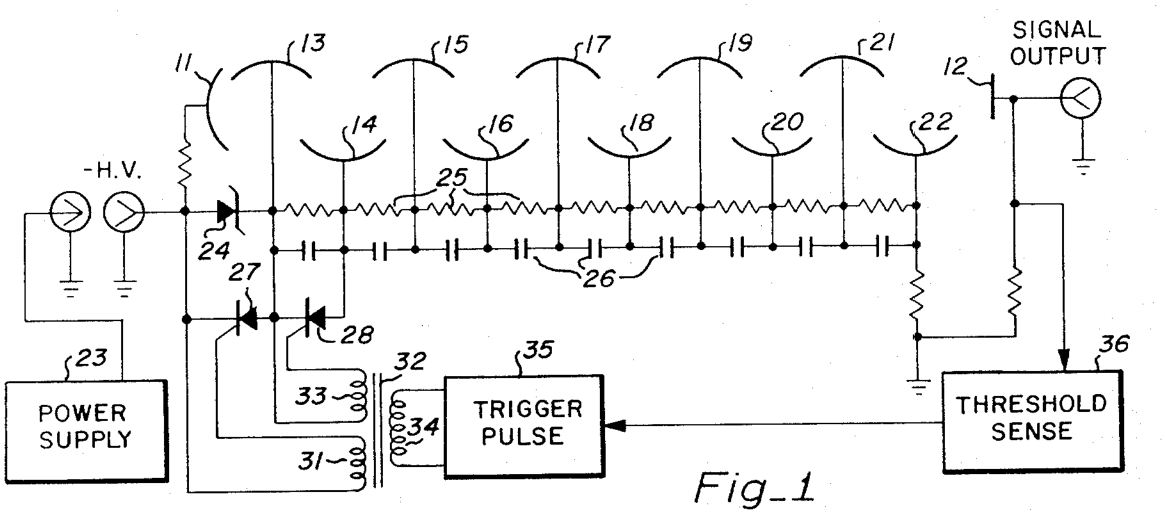
FIG. 1 is a schematic diagram of a photomultiplier device incorporating the novel switching device placed across two of the multiplier stages.

Referring now to FIG. 1, the typical form of photomultiplier device comprises a plurality of electrodes arranged in sequential manner along an electron beam path therethrough and including a light sensitive, photoelectron emitting cathode 17, an anode 12, and a chain of dynodes 13–22. A high voltage, for example of the order of 1200 V, is coupled from the main power supply 23 to a voltage divider circuit coupled to the chain of electrodes and including the series connected zener diode 24 and resistors 25 and capacitors 26. This voltage divider provides the desired bias voltage of about 120 V across each pair of dynodes, the zener diode insuring a slightly higher, constant bias voltage between the cathode 11 and the first dynode 13.

A first switching device or silicon controlled rectifier (SCR) 27 is connected across the cathode 11 and first dynode 13 while a second SCR 28 is connected across the first dynode 13 and the second dynode 14. A first secondary winding 31 of a pulse transformer 32 is coupled to the triggering gate of the first SCR 27 and a second secondary 33 on the pulse transformer 32 is coupled to the triggering gate of the second SCR 28. The primary winding 34 of the pulse transformer is coupled to a suitable source 35 of a blanking or triggering pulse. The blanking pulse source 35 is controlled from a voltage threshold sensitive circuit 36 coupled to the output of the multiplier. When a particular maximum voltage level occurs at the multiplier output indicating an excessive light intensity, the threshold circuit operates to initiate the blanking pulse.

In operation, with the high voltage power supply 23 energized and with both SCRs 27 and 28 nonconducting, the photomultiplier tube is biased in normal fashion with about 120 V across each neighboring pair of dynodes. Radiation impinging on the light sensitive cathode 11 will cause photoelectrons to be emitted therefrom and directed onto the first dynode 13, where multiple electrons are emitted for each incident electron, these additional electrons being directed onto the second dynode 14. Electron multiplication thus takes place from dynode to dynode until the final electron collection at the anode 12 in well known manner. The tube is designed to have a high gain and high sensitivity and is thus useful for the measurement of very weak radiant intensities. Since the gain of the photomultiplier is the product of the gain of each stage of multiplication in the dynode chain, the gain of the device may be reduced to zero by reducing the gain of only one stage, i.e., the stage between two neighboring electrodes, to zero. In the present invention, this is accomplished by the SCRs 27 and 28.

When a blanking pulse is applied to the gate of the SCR 27 between the cathode 11 and the first dynode 13 via the pulse transformer 32, the SCR 27 conducts fully and the voltage between the cathode 11 and the first dynode 13 drops from its normal value of > 120 V to less than 3 V. Now the photoelectrons that are being emitted by the cathode 11 are not focused onto the first dynode 13 so that much fewer of these electrons arrive at this dynode 13. In addition, those electrons that do arrive have insufficient energy to cause reemission from this dynode. The second SCR 28 is provided to reduce the voltage across the first and second dynodes 13 and 14 to doubly assure that no electrons will be propagated to subsequent stages of the multiplier.

Although two switching devices 27 and 28 have been shown, only one is needed to sufficiently reduce the sensitivity of the photomultiplier to protect it from high radiant intensity. The preferred position for this one SCR is between the cathode electrode 11 and the first dynode 13 since there are a minimum number of emitted electrons at this point and the reduction of the bias voltage at this stage is most effective in preventing these electrons from striking the first dynode. For the same reason, the next most preferred stage for the SCR is between the first dynode 13 and the second dynode 14. Although these two positions are most favored, one or more of the other dynode stages may be short circuited, as desired, to obtain the decrease in sensitivity.

Figure 2A:
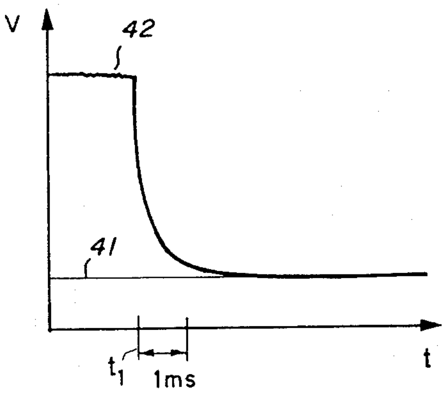
FIGS. 2(a) and (b) are oscilloscope traces of the photomultiplier output illustrating the desired decrease in sensitivity to incoming light.
Figure 2B:
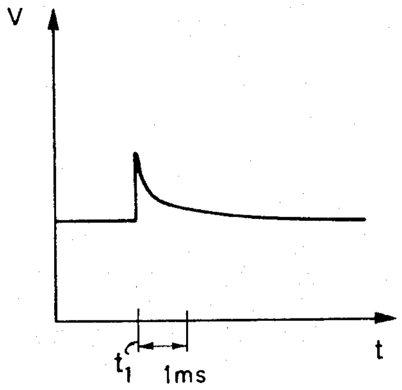

There is shown in FIG. 2(a) two oscilloscope traces of the output of a photomultiplier device incorporating the present invention. The lower horizontal trace 41 is a zero trace taken with no light impinging on the photomultiplier. The upper trace 42 is produced with a light input; the blanking pulse is applied to the SCRs at time $t_1$ and the upper trace deflects to the zero trace indicating the tube sensitivity to light has been eliminated. This trace would indicate, however, a long settling time of several milliseconds which would be too slow for most applications. The measurements shown in FIG. 2(b) was made to determine whether the tube sensitivity actually dropped to zero this slowly or whether this effect was due to some other phenomenon. The oscilloscope trace of FIG. 2(b) was made with no light impinging on the photosensitive cathode 11 and a blanking pulse applied to the SCRs at time $t_1$. The characteristic time response of trace 42 and the trace of FIG. 2(b) is seen to be the same, therefore, the tube sensitivity is not slowly changing. The long time constant pulse is due to the power supply voltage readjusting itself across the dynodes not shorted out by the SCRs. The tube sensitivity actually drops to near zero in the relatively fast time of 5 microseconds.

Although SCRs have been employed as the shorting devices it should be understood that other suitable forms of switching devices such as high voltage switching transistors could be utilized.

What is claimed is:

1. A photomultiplier device comprising a plurality of electrodes arranged in sequential manner along an electron beam path therethrough and including a light sensitive cathode, an anode, and a plurality of dynodes positioned in spaced-apart manner between the cathode and anode, means including a power supply for providing bias voltage across successive pairs of said electrodes, a first switching rectifier coupled between said cathode and the first dynode in the path between said cathode and said anode, a second switching rectifier coupled between the said first dynode and the second dynode in the path between said cathode and said anode, and means for at times activating said first and second rectifiers to turn off the device by reducing the voltage between the electrodes connected to said rectifiers to substantially zero and thereby reducing the sensitivity of the photomultiplier to substantially zero.

* * * * *